F. J. HEYBACH.
AUTOMATIC WEIGHING AND FILLING MACHINE.
APPLICATION FILED MAR. 31, 1910.
991,305.
Patented May 2, 1911.
4 SHEETS—SHEET 4.
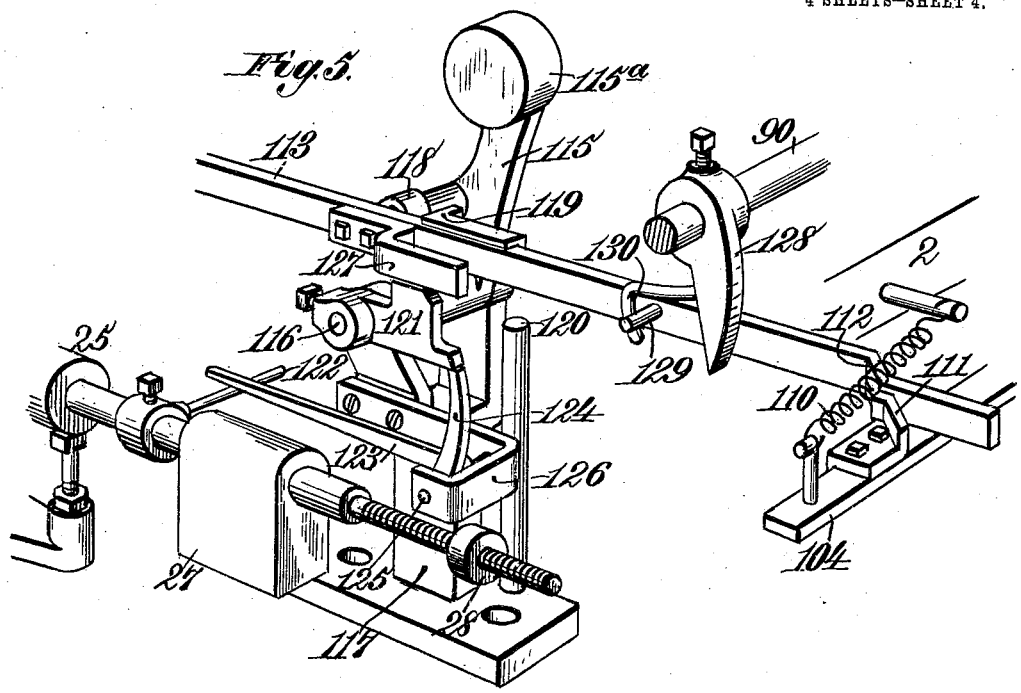
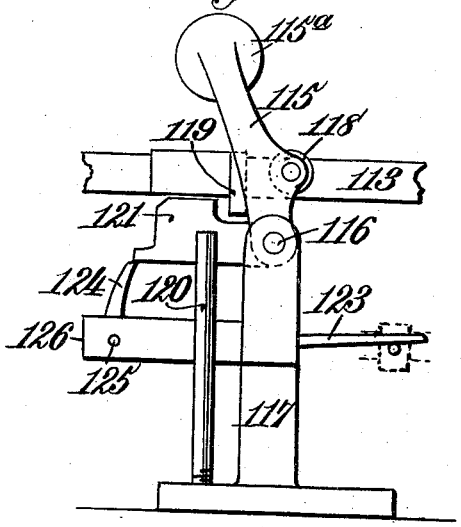
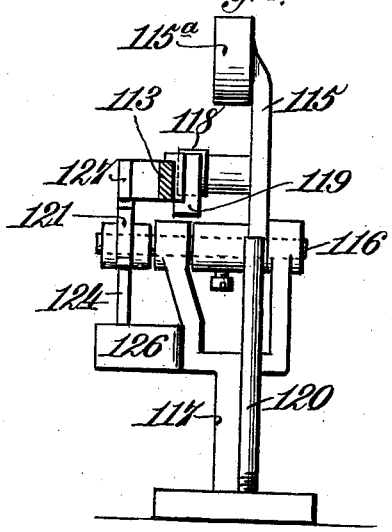
Witnesses.
Inventor.
Frederick J. Heybach.
By
Atty.

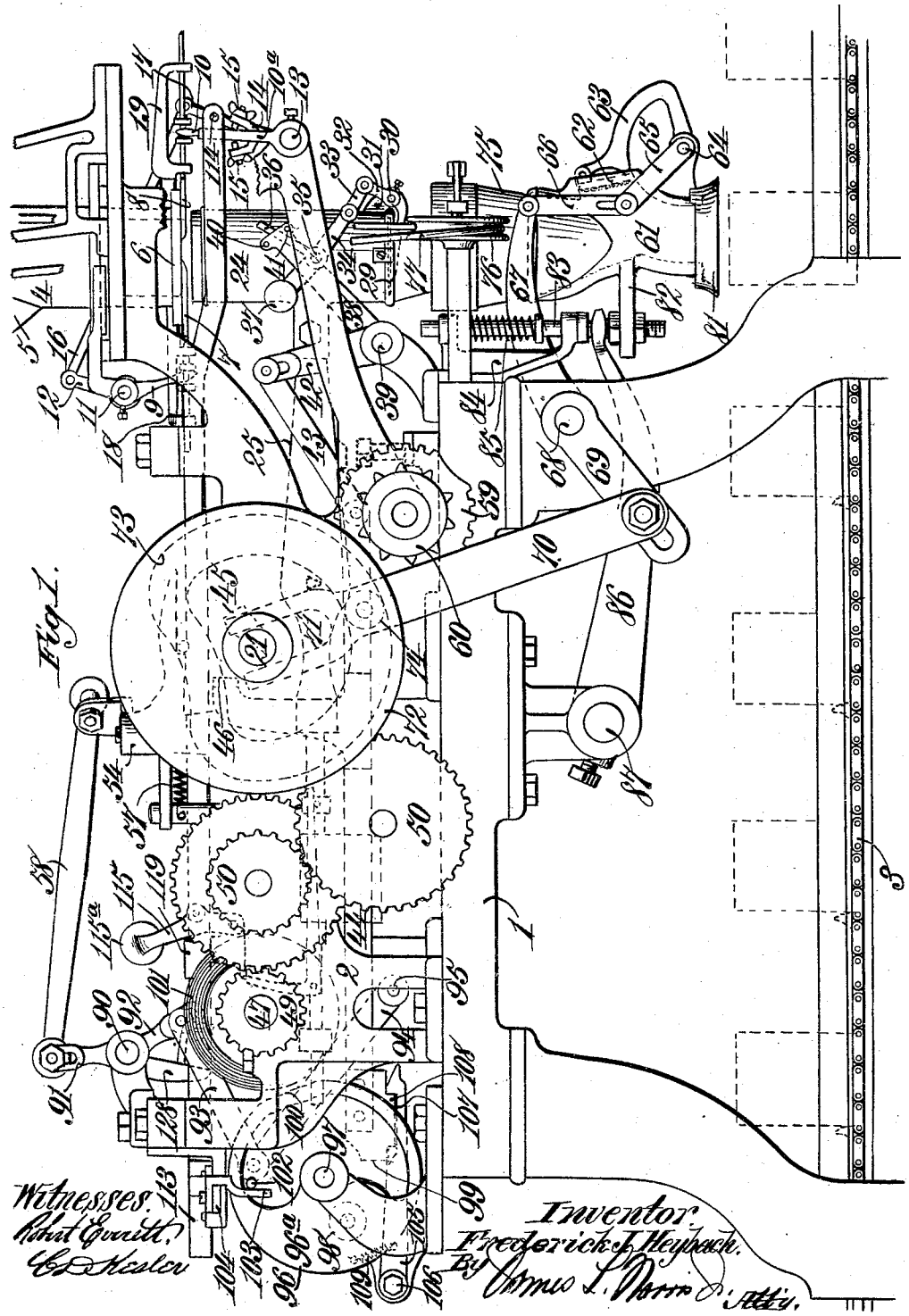

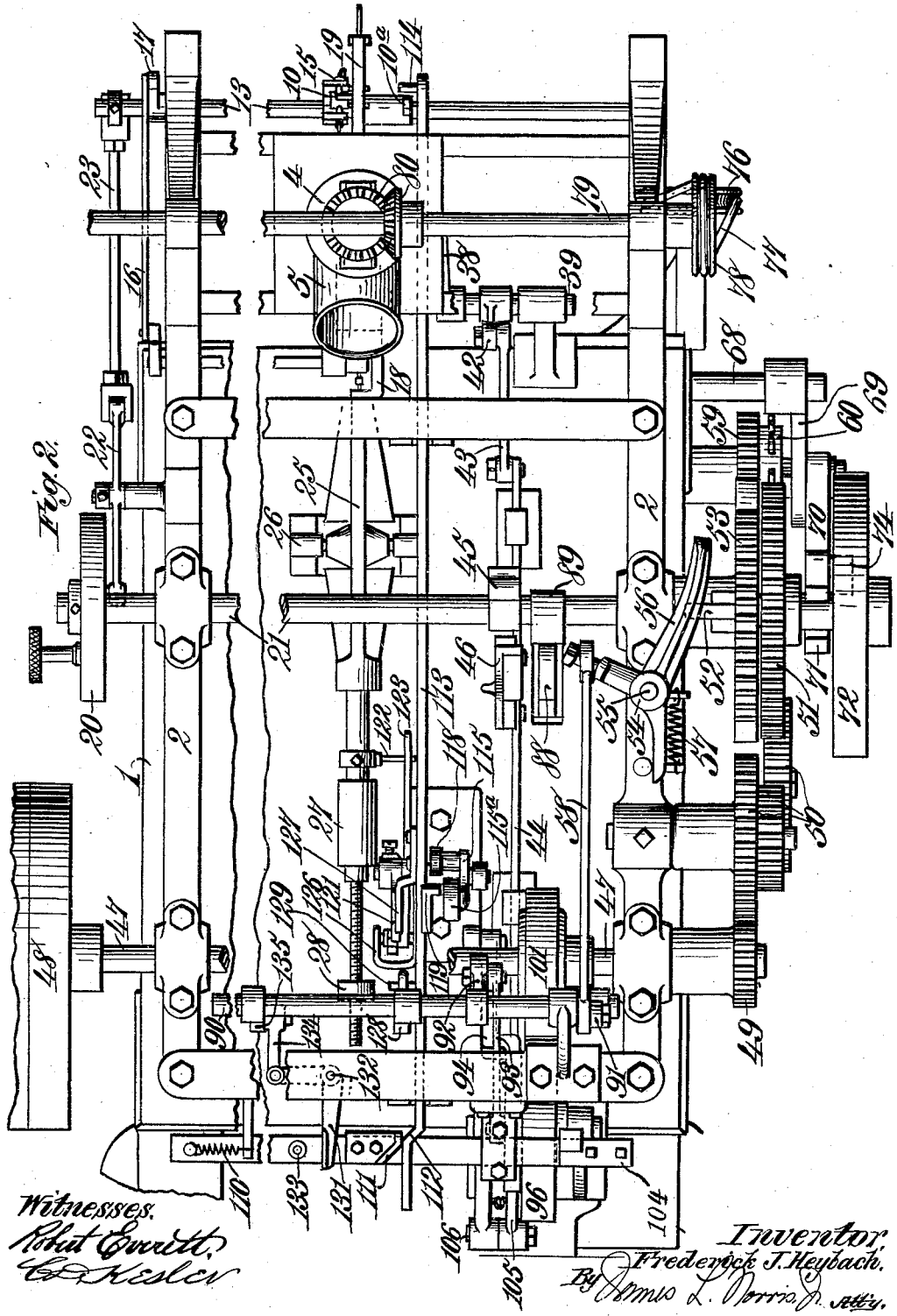

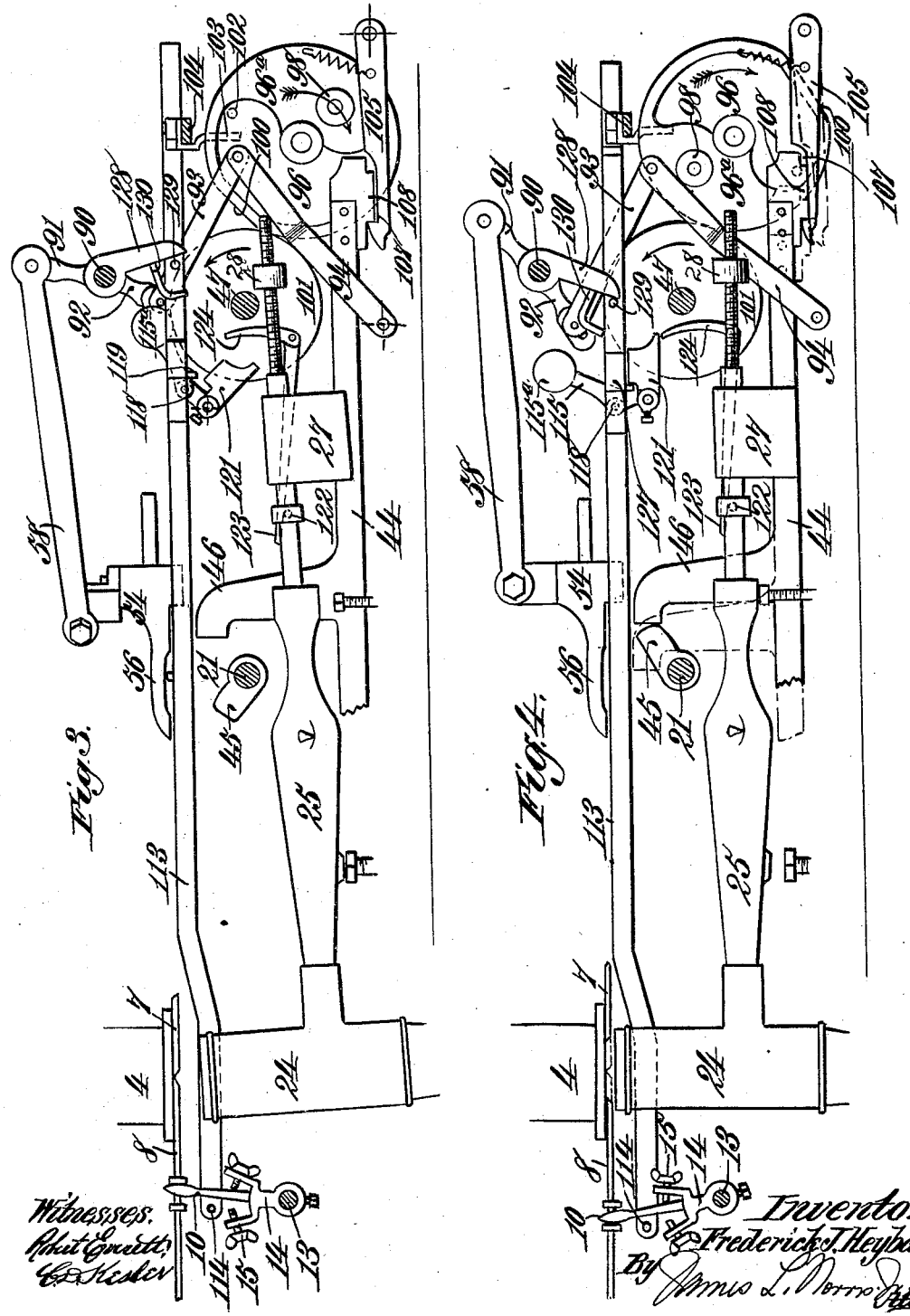

UNITED STATES PATENT OFFICE.

FREDERICK J. HEYBACH, OF BALTIMORE, MARYLAND, ASSIGNOR TO THE AMERICAN AUTOMATIC MACHINERY COMPANY, OF SAVANNAH, GEORGIA, A CORPORATION OF GEORGIA.

AUTOMATIC WEIGHING AND FILLING MACHINE.

991,305.  Specification of Letters Patent.  Patented May 2, 1911.

Application filed March 31, 1910. Serial No. 552,583.

*To all whom it may concern:*

Be it known that I, FREDERICK J. HEYBACH, a citizen of the United States, residing at Baltimore city and State of Maryland, have invented new and useful Improvements in Automatic Weighing and Filling Machines, of which the following is a specification.

My present invention relates to improvements in weighing and filling machines and more especially to the type adapted to weigh out and supply predetermined charges of material to relatively small receptacles, such for instance, as cans, cartons or the like, and the primary object of the invention is to provide a generally improved machine wherein the weighing of the relatively small charges of material, usually a fraction of a pound, may be effected rapidly and accurately, each weighing operation being terminated automatically upon the completion of each load or charge under the control of the weighing mechanism, but the requisite power to perform this function is derived from an automatic valve or gate-closing device which is in readiness to act instantly, when released by the weighing mechanism, to terminate the weighing operation, the weighing mechanism merely controlling the operation of the valve or gate-closing device so that the greatest accuracy in the weighing operation is insured.

Another object of my present invention is to provide improved valve or gate-actuating mechanism for weighing machines of the type wherein the bulk of the material is dumped quickly into the weigh hopper by a loading stream, and the charge of material is completed or made up by a drip stream which continues until a balance is obtained, the present invention providing simple and efficient means for quickly closing the valve or gate to immediately cut off the drip stream which means is under the control of the weighing mechanism, but possesses an inherent power to actuate the valve so that no appreciable amount of resistance is offered to the weigh beam that might produce an inaccuracy into the weighing operation, particularly in those cases where charges of the weight of a pound or less are being weighed, the valve or gate-closing mechanism being automatically restored after each weighing operation has been completed.

A further object of the present invention is to provide improved mechanisms for automatically effecting the discharge of each load or charge of the material into a receptacle and also in certain instances for operating a packer which serves to press the material into the receptacle, the packer-operating mechanism being under the control of the load-discharging mechanism and both of said mechanisms are under the control of the weighing mechanism so that the packer will operate only after the load has been properly weighed out and discharged into the receptacle, and neither of said mechanisms is permitted to operate until after each charge of material has been properly weighed.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 represents a side elevation of a weighing and filling machine constructed in accordance with my present invention; Fig. 2 represents a top plan view of the machine as shown in Fig. 1, certain units of the machine, however, being omitted for clearness in illustration; Figs. 3 and 4 are detail views of one of the weighing units of the machine, the former view showing the position of the parts when the weigh hopper has received a full charge of material but prior to the discharge thereof, and Fig. 4 showing the position of the parts after they have been restored and subsequent to the discharge of the load from the weigh hopper; Fig. 5 is a perspective view of one of the devices for automatically cutting off the drip or balancing stream under the control of its respective weigh beam; and Figs. 6 and 7 are detail views of the valve or gate-actuating device.

Similar parts are designated by the same reference characters in the several views.

In the accompanying drawing, I have shown the present improvements as applied to an automatic weighing and receptacle-filling machine of a certain type, and such improvements may be used to especial advantage in such cases. It will be understood, however, that the improvements are not necessarily limited to a machine of this particular type, as certain of the features are applicable to automatic weighing machines in general.

In the present instance, the machine comprises a main frame 1 and an upper or superposed frame 2, the latter serving to support part of the mechanism of the machine. The machine shown in the present instance is of the type which is capable of simultaneously weighing a plurality of charges of material and of simultaneously dumping such charges into a corresponding number of receptacles that are fed to and from the filling machine by conveyers 3, and to this end, the machine embodies a plurality of weighing and filling units, any number of which may be used according to the desired capacity of the machine, the several units suitably controlling the mechanisms for dumping the charges into the receptacles, for packing the charges into the receptacles in those cases where packers are employed, for advancing the can conveyer or feeding means, and for performing such other operations as may be desirable. My prior Patent, No. 935,506 granted September 28, 1909 discloses in a general way a filling machine which is capable of simultaneously supplying charges to a plurality of receptacles resting upon suitable conveying means. In the present instance, however, I have shown one weighing and filling unit, but as such other units as might be added or used can be of duplicate structure, a description of one unit will be sufficient.

Each unit of the machine comprises a supply hopper 4 into which the material is supplied to the machine through a pipe or duct connected to the branch 5. The bottom 6 of the supply hopper is provided with a suitable opening or openings through which the material may flow to the weighing or charge-dividing means, the flow of the material from the supply hopper being under the control of a suitable valve or gate. In the present instance, a pair of oppositely movable valve members 7 and 8 are mounted to slide upon the under side of the hopper bottom 6 and these members are actuated by a corresponding pair of arms 9 and 10. The arm 9 for each valve member 7 is fixed to a rock shaft 11 and the latter is provided with an actuating arm 12. The arm 10 for the valve member 8 is loosely mounted on a second rock shaft 13 and this valve arm 10 is operated to move the valve member 8 into open position so as to permit a loading stream to flow from the supply hopper and also the valve member 8 into a partially closed position to permit a drip or balancing stream to flow from the supply hopper by a valve-actuator 14 which is fixed to the rock shaft 13 and has a pair of opposed set-screws or projections 15 which are arranged at opposite sides of the arm 10 but permit a sufficient play of the arm 10 as to allow the latter to effect the final closing movement of the valve member 8 to cut off the drip or balancing stream. The valve members 7 and 8 are in the present instance simultaneously moved into fully open position for the loading stream and to partially closed position to form a drip stream by a suitable connection between the rock shafts, this connection in the present instance involving a link 16 which is connected at one end to the actuating arm 12 on the rock shaft 11 and its opposite end is connected to an actuating arm or crank 17 upon the rock shaft 13. Suitable guides 18 and 19 which may be fixed to a part of the supply hopper serve to support the two valve members so as to insure the proper sliding movements thereof. Motion is imparted to the rock shaft 13 so as to first open the valve members to form a loading stream and to move said members into a position to form a drip stream after a certain period of time has elapsed, the means employed for this purpose consisting in the present instance of an appropriate time cam 20 which is mounted on a cam shaft 21 which is journaled in the upper frame 2 of the machine, and this cam operates upon a bell-crank lever 22, the latter being connected through a link 23 to the rock shaft 13. It is to be understood, of course, that the rock shafts 11 and 13 serve to operate in the manner hereinbefore described, the valves or gates for all of the units of the machine.

The material flowing from the supply hopper is made up according to the present invention into charges of predetermined weight. For this purpose, a weigh hopper 24 is mounted beneath the supply hopper so as to receive the material therefrom, this weigh hopper being mounted upon a weigh beam 25 which latter is fulcrumed upon knife-edge bearings supported by a bracket 26, and the weigh beam is suitably counterbalanced by the main and supplemental counterweights 27 and 28, respectively. The bottom of each weigh hopper is provided with a discharge gate 29 which may be of any suitable construction. I prefer, however, to employ one of the construction disclosed, it being pivoted upon an axis 30 supported by a bracket 31 on the weigh hopper, and this axis 30 has an actuating arm or crank 32 fixed thereto. The end of the actuating arm or crank 32 is pivotally connected to a link 33, and the latter in turn is pivotally attached to an operating lever 34, the latter being preferably pivoted to the weigh hopper upon the center 35 and the lever 34 is provided above its center with an actuating arm 36 and also a counterweight 37. The counterweight is so located with respect to the center 35 that when the discharge gate 29 is in closed position, the counterweight will act to retain it yieldingly in such position. The actuating arm 36 is operated by an arm 38, the latter being fixed to a rock shaft 39 which is common to all of the units of the machine, and in the present instance, the actuating arm 38 is provided with a pair of projections 40 and 41 which alternately act upon the arm 36 in opening and closing the discharge gate. The rock shaft 39 for the discharge gate is operated by a crank or arm 42 and the latter is pivotally attached to a link 43 which in turn is pivotally connected to the discharge gate actuating bar 44, this bar being suitably guided so as to reciprocate longitudinally of the machine, and in doing so, it rocks the shaft 39 and opens or closes the discharge gate according to the direction of movement of the bar. This discharge gate actuating bar is restored to normal position to close the discharge gate by the cam shaft 21, this cam shaft carrying a cam projection 45 which is arranged to operate upon the resetting arm 46 which is fixed to the actuating bar 44. The manner in which the bar 44 is actuated to open the load-discharging gate will be hereinafter described in detail.

After the weigh hopper has received the bulk of a load and during the completion of the load by the drip or balancing stream, the cam shaft 21 will be stationary or at rest. This cam shaft is driven from a main shaft 47 which is journaled in the upper frame 2 of the machine and may receive power continuously during the operation of the machine in any suitable manner, such for instance, as by the pulleys 48. This main shaft 47 is provided with appropriate gearing for connecting it to the cam shaft 21 whereby the latter may be operated at appropriate intervals. In the present instance, the shaft 47 is provided with a pinion 49 which operates through intermediate gearing 50 to drive the gear 51 mounted on the cam shaft 21. This gear 51, however, is loosely mounted upon the cam shaft 21 and is adapted to form a driving connection with the cam shaft through the medium of a clutch. This part of the machine as shown in the present instance may be similar to that disclosed in my prior Patent, No. 935,506 granted September 28, 1909, it being deemed sufficient to indicate that 52 represents the finger or connecting member of the clutch which finger is pivoted to rock upon the hub of a gear 53 which latter is fixed to the rock shaft, the finger being arranged to coöperate with a part of the constantly revolving gear 51 when such finger is released and thereby form a driving connection between said gear and shaft. The finger 52 is normally held in retracted or disconnected relation to the driving gear 51 by a clutch controller 54 which in the present instance is pivoted at 55 upon the frame 2 of the machine and has an arm 56 which is adapted to ride upon the tail of the clutch finger 52 and thereby retract it. When, however, the clutch controller is shifted so as to carry the arm 56 thereof into a position to disengage from the clutch finger 52, the latter is released and permitted to form a driving connection between the driving gear 51 and the cam shaft. The clutch controller is normally retained in a position to hold the clutch finger 52 in non-driving condition by a spring or its equivalent 57 and the clutch controller is actuated automatically and in a manner to be hereinafter described by a link 58. In the present instance, the cam shaft under the control of the clutch serves to operate the conveyer 3 so as to successively introduce and remove the receptacles with respect to the filling mechanism of the machine as disclosed in my prior Patent, No. 935,506 aforesaid. The gear 53 serves to perform this function, it having an interrupted surface thereon and it is arranged to coöperate with a complemental gear 59 which serves to drive a sprocket wheel or its equivalent 60, this sprocket wheel being operatively connected in any suitable way to the receptacle-feeding mechanism.

Below the weighing hopper, I mount suitable means for introducing the charges of material into receptacles upon the conveyer. In the present instance, I have shown as an example, a packer 61 which is capable of receiving each charge of material and pressing the material into the receptacle. The specific construction of this packer is not claimed in the present application, but it may be described briefly as consisting of a casing which forms a passage for the charge of material and a compression member 62 which operates in an arc-shaped path within the packer casing and is adapted to press upon the material and thereby force it into the receptacle. The compression member is operated by an arm 63 which is pivoted to the packer casing at 64 and is actuated by an arm 65, the latter being connected by a link 66 to an arm 67 and the arm 67 for the packer of each unit is operated by a common shaft 68 and this shaft is operated by an arm 69 which in turn is pivotally connected to a bar 70. The cam shaft 21 in the present instance is also utilized to operate the packer of each unit at appropriate intervals. To this end, the upper end of the bar 70 is forked as at 71 so as to straddle a portion of the cam shaft 21, and the latter has a cam 72 fixed thereon, this cam having a cam track 73 thereon in which a roller or projection 74 upon the bar 70 operates, the formation of the cam track being such that reciprocatory movements will be imparted to the bar 70 in a certain timed relation to the operation of the discharge gate. The packer may be provided with a supplemental receiving hopper 75 in order that each packer may receive a full charge of the material without spilling or waste, and the hopper 75 may contain an agitator to be driven from a crank wheel 76 which in turn may be operated by a belt 77 driven from a pulley 78 which latter is fixed to a horizontal shaft 79, this shaft 79 also operating through gearing 80 a suitable stirrer contained within each supply hopper 4. The bottom of the packer is provided with a mouth 81 to rest upon the top of each receptacle as the latter is positioned to receive a charge of material. In order that the receptacles may be carried to and from filling position, the packer is so mounted upon the machine that it may move vertically. In the present instance, the packer is provided with a supporting lug 82, and a guide bar 83 is attached to this lug and operates through a suitable bracket 84 which is rigidly attached to the machine frame. A spring 85 operates upon the guide bar 83 with a tendency to depress the packer, the lifting and lowering movements of the packer being effected, however, by an arm 86 which is fixed to a common operating shaft 87, one of these arms 86 being provided for the packer of each unit, and the common operating shaft 87 is actuated at appropriate intervals by an arm 88 which coöperates with a cam 89 fixed to the cam shaft 21.

The clutch controller 54 is actuated from a rock shaft 90 which is suitably journaled upon the machine frame, and this rock shaft is operated subsequent to the completion of each weighing operation and is under the control of the weighing mechanism. The link 58 for actuating the clutch controller is connected to the rock shaft 90 in the present instance by an arm 91. An arm 92 is also rigidly attached to the rock shaft 90 and is pivotally connected to a link 93 and the latter in turn is pivotally connected to an arm 94 which serves to actuate the rock shaft 90, this arm 94 being pivotally connected at 95 to a suitable part of the machine frame.

According to the present invention, the actuating bar for opening the discharge gate, and the clutch controller for setting the cam shaft into operation are both under the control of the weighing mechanism and are actuated automatically and in proper sequence by a simple and efficient device which is driven from the shaft 47. This device in the present instance involves a rotary member in the form of a wheel 96 which is revolubly journaled upon the shaft 97 which is supported in stationary position upon the machine frame, and the revoluble member 96 carries a roller or projection 98 which performs the dual function of actuating the bar 44 to first open the discharge gate and to subsequently lift or actuate the arm 94 to set the cam shaft into operation, the bar 44 having a heel 99 upon its end to coöperate with the roller 98 and a part of the arm 94 is also adapted to subsequently coöperate with this roller.

The rotary member 96 is normally disconnected from the shaft 47 but when released in a manner to be hereinafter described, it will form a driving connection with the shaft 47 and thereby receive power therefrom to perform the functions above stated. In the present instance, an interrupted or mutilated gear connection is formed between the rotary member 96 and the shaft 47, the member 96 having a flattened portion 100 at a predetermined point in its otherwise concentric periphery which flattened portion will normally be opposed to a driving wheel 101 fixed to the shaft 47. A friction drive is preferably used owing to the fact that it will receive and transmit the movement evenly and without vibration, the concentric portion of the circumference of the rotary member 96 and the concentric periphery of the wheel 101 being preferably smooth. The wheel 101 may be fitted with a tire of rubber or other material that will afford the requisite friction. The rotary member 96 is heavier at one side of its center than at the other, it being webbed in the present instance so as to form a thickened portion 96ª at one side so that when this member is released, it will immediately settle into a position to carry a concentric portion of its periphery into engagement with the driving wheel 101 on the shaft 47. The rotary member 96, however, is normally held in an inoperative position and in disconnected relation to the shaft 47 by a pin or projection 102 which is fixed to the wheel and a detent 103, the latter being attached to a controlling bar 104 which is common to the several units of the machine and is released after the last weighing machine has completed its weighing operation. The actuating bar 44 for the discharge gate is preferably locked in a position to retain the discharge gate in closed position by an appropriate latch, the latch 105 shown in the present instance being pivoted to a stationary part of the machine frame at 106 and provided with a recess 107 adapted to receive a lug 108 formed upon the under side of the heel 99 of the bar 44. This latch 105 is normally held in locking position by a spring or its equivalent 109, and this latch is also arranged in the path of the roller 98 on the rotary member 96 whereby rotation of the member 96 will first cause the roller 98 to engage, depress and thereby move the latch 105 into a position to release the bar 44 whereupon a further rotation of the member 96 will bring the roller 98 into position to bear upon the end of the heel 99 and thereby shove the bar 44 in a direction to open the discharge gate.

The controlling bar 104 is mounted in suitable guides so as to slide transversely of the machine frame, and a spring 110 or its equivalent constantly acts upon this bar to move it into a position to free the detent 103 thereon from the pin or projection 102 on the rotary member 96. A wedge 111, however, is attached to the controlling bar, one of these wedges being provided for each unit of the machine and this wedge coöperates with a similar wedge portion 112 formed upon a reciprocatory bar 113 which is a part of each unit of the machine. The controlling bar 104 therefore cannot move into a position to release the rotary member 96 until the bar 113 has been actuated and, obviously, in using a plurality of units in the machine, all coöperating with the controlling bar 104, this bar could not operate until after the last machine has completed its weighing operation. The bar 113 is suitably guided to reciprocate longitudinally of the machine and it is the medium through which the feed valve is finally closed to cut off the drip or balancing stream. To this end, the bar 113 is provided with a projection 114 which is arranged to act upon the arm 10$^a$ for the valve member 8 and thereby impart to the latter a movement that will completely close the feed valve and thereby interrupt the feed of material to the weigh hopper. The bar 113 is operated automatically and under the control of the weighing mechanism. My present invention provides a simple and efficient device for instantly and forcibly actuating the bar 113 to immediately interrupt the supply of material to the weigh hopper when the latter has received a properly weighed charge of the material. In the present instance, the actuating device for the bar 113 embodies a suitably weighted arm 115 which is pivoted upon an axis 116 which is supported in bearings formed upon a stationary standard 117, and the weighted arm 115 is provided with a roller or projection 118 which is arranged in coöperative relation with a shoulder or stop 119 secured to the bar 113 whereby a dropping of the arm 115 under the action of its weight 115$^a$ will cause the roller or projection 118 to strike the shoulder or stop 119 and impart a quick stroke to the bar 113 so as to bring the projection 114 thereon into action to effect an immediate closure of the valve. A rest 120 may be provided for receiving the final impact of the weighted arm 115 and to retain this arm in a position so that the roller or projection 118 will not leave the path of the shoulder or stop 119.

The dropping of the weighted arm 115 and the consequent closure of the feed valve are under the control of the weighing mechanism. In the present instance, I provide the shaft 116 to which the weighted arm is fixed with a pawl 121 and I provide the counterweighted end of the weigh beam 25 with a releasing arm or projection 122. A trigger is interposed between the releasing arm 122 on the weigh beam and the pawl 121 which controls the weighted arm 115, this trigger in the present instance consisting of an arm 123 which rests upon the arm 122, and a second or tripping arm 124 upon the end of which the extremity of the pawl 121 rests. The operating arm 123 and the tripping arm 124 of the trigger are mounted in fixed relation and upon a shaft 125 which is journaled in a suitable supporting bracket 126, this bracket being attached to the standard 117 or to any other stationary or fixed part of the machine. Upon a settling of the weigh hopper after a charge of the proper weight has been received thereby, the counterweighted end of the weigh beam will rise, carrying with it the arm 122 which will thereupon act on the operating arm 123 of the trigger, causing the tripping arm 124 of the trigger to move from beneath the pawl 121 and thereby permitting the weighted arm 115 to drop, carrying the roller or projection 118 thereon into engagement with the shoulder or stop 119 on the bar 113 with a blow sufficient to quickly close the feed valve. After the load has been dumped from the weigh hopper, due to the subsequent opening of the discharge gate, the counterweighted end of the corresponding weigh beam will, of course, settle, permitting the trigger to return to a position where the tripping arm 124 thereon will have a tendency to snap beneath the pawl 121. The return movement of the bar 113 causes the shoulder or stop 119 thereon to act upon the roller or projection 118 on the weighted arm 115 so as to restore the latter to normal position and in readiness for a subsequent operation.

In order to prevent an overthrowing of the weighted arm 115 during its restoring movement, a suitable guard 127 may be attached to the bar 113 immediately above the pawl 121 so that the pawl 121 will strike this guard immediately after the tripping arm 124 of the trigger has returned to a position beneath the pawl, the pawl of course again settling upon the trigger. The resetting of the bar 113 after the completion of each weighing operation is effected automatically in the present instance by the rock shaft 90 which is provided with an arm 128, such arm being adapted to bear upon a stud or projection 129 fixed to the bar 113.

This arm 128 on the rock shaft is adapted to move the bar 113 sufficiently to carry the projection 114 thereon clear of the operating mechanism for the valve member 8 in order that such valve mechanism may operate to fully open the valve. The bar 113, however, is subsequently partially returned after the valve has been brought to a drip stream position in order that the operating projection 114 on the bar 113 may be in immediate proximity to the adjacent valve-operating arm so as to avoid undue lost motion and thereby insure an instant closing of the valve. This partial return movement of the bar 113 is effected also through the rock shaft 90 and in the present instance, it is to be accomplished by a hook 130 which may be attached to the arm 128 as shown, the hook 130 being adapted to operate upon the opposite side of the stud or projection 129. Upon the restoring movement of the bar 113, the wedge portion 112 thereon will act against the wedge 111 on the controlling bar 104 to restore the latter to normal position. The restoring of the controlling bar 104 may, however, be also effected by a bell-crank 131 which is pivoted at 132 upon a stationary part of the machine frame, one end of this bell-crank being arranged to coöperate with a roller or projection 133 upon the bar 104 while the other arm of the bell-crank is connected by a link 134 to an operating crank or arm 135 upon the rock shaft 90.

In operation, let it be assumed that the members 7 and 8 of the feed valve have been fully opened and then closed partially to form a drip or balancing stream. At this time, the cam shaft 21 is at rest, the shaft 47 is revolving continuously, the rotary member 96 is at rest in the position shown in Fig. 1, and the bar 113 is in the position shown in Fig. 2, that is to say, it is partially retracted and the projection 114 thereon is immediately behind the valve-closing arm 10ª. The weighted arm 115 also occupies its normal elevated position as shown in Figs. 5 and 6. The moment the weigh hopper receives a properly weighed charge of material, the rising of the counterweighted end of the weigh beam will operate the trigger to release the pawl and thereby allow the weighted arm 115 to drop, the roller or projection 118 on this arm being projected against the shoulder or stop 119 on the bar 113 with sufficient speed and power to effect an instant closing of the valve member 8 and a cutting off of the drip or balancing stream through the projection 114 and the arm 10ª. The movement of the bar 113 under the action of the weighted arm 115 will release the wedge 111 on the controlling bar 104, thereby permitting the latter to move in a direction that will carry the detent 103 thereon free of the stud or projection 102 on the rotary member 96. The latter will then immediately settle or turn so as to carry its concentric peripheral portion into engagement with the continuously revolving wheel 101 on the driving shaft 47. Rotary motion will be thereby transmitted to the rotary member 96, causing the roller or projection 98 thereon to first engage and depress the latch 105 so as to release or unlock the bar 44, a further movement will bring the roller 98 into engagement with the heel 99 on the bar 44, causing the latter to move toward the right in Fig. 1 and thereby operate to open the discharge gate 29 and dump the charge of material into the receptacle, and a continued rotation of the member 96 will cause the roller 98 thereon to engage and lift the arm 94, the latter operating through the link 93 to rock the shaft 90 which will then act through the link 58 to turn the clutch controller 54 in a direction to release the clutch finger 52 and permit the latter to form a driving connection between the gearing driven from the shaft 47 and the cam shaft 21. Simultaneously with the setting of the clutch into operation, the arm 128 on the rock shaft 90 will engage the stud or projection 129 on the bar 113 so as to push the latter in a direction to restore the weighted arm 115 to normal elevated position and to carry the projection 114 on this bar into a position to clear the arm 10ª on the rock shaft 13 and thereby permit the latter to operate freely during the full opening of the valve. Upon the resetting of the bar 113, the controlling bar 104 is returned to a position that will bring the detent 103 thereon into position to engage the stud or projection 102 on the member 96 when the latter has completed one revolution, the flat portion 100 on the member 96 being at this time opposite or adjacent to the wheel 101 so that the rotation of the member 96 will be interrupted.

Rotation of the cam shaft 21 serves to restore the actuating bar 44 and thereby close the discharge gate through the cam projection 45 and the restoring arm 46, the latch 105 relocking the bar 44. The time cam 20 operates to fully open the valve and then partially close the valve after the lapse of a sufficient period of time so as to first load a bulk of the material into the weigh hopper and then reduce the stream to a balancing or drip stream. Rotation of the cam shaft also serves to operate the packer so as to press the material into the receptacle, through the medium of the cam 72 on the cam shaft and the packer-operating bar 70 with its roller 74 which operates in the cam groove 73 in the cam. The cam shaft 21 also operates through the cam 89 and the arm 88 to carry the packer into a position to rest upon the receptacle during the introduction and pressing of the material therein, and to also lift the packer from the receptacle after the latter has received its charge, and the cam shaft 21 also operates the sprocket wheel 60 to advance the receptacle feeding means whereby another receptacle is brought into a position to receive a charge from the filling mechanism. The final part of the rotation of the member 96 carries the roller 98 thereon free of the arm 94, the rock shaft 90 being thereby permitted to return to its normal position and allowing the clutch controller 54 to resume a position to engage the clutch finger 52 and operate thereon to disconnect the clutch after the cam shaft has completed one revolution.

The foregoing cycle of operations will continue automatically and in proper sequence, the final closure of the feed valve being under the control of the weighing mechanism and being effected by a simple and efficient mechanism which insures the greatest accuracy in the weighing operation, the discharge of each load of material from the weigh hopper is effected under the control of the weighing mechanism, and the operation of the packer and other mechanisms is also under the control of the weighing mechanism, a common device being provided in the present instance for first operating the discharge gate to dump the load and subsequently setting the packer into operation to compress a charge into the receptacle, both mechanisms being controlled by the weighing machine and, moreover, the relation of such mechanisms is such that a proper sequence in their operations is insured.

I claim as my invention:—

1. In a weighing machine, the combination of a supply hopper provided with a feed valve, weighing means adapted to receive and weigh material from said hopper, means for operating said valve to supply a loading stream and subsequently a balancing stream to said weighing means, and means normally inactive relatively to said valve and having inherent power to operate and complete the closure of said valve to cut off the balancing stream under the control of said weighing means.

2. In a weighing machine, the combination of a supply hopper provided with a feed valve, weighing means adapted to receive material from said hopper, means for operating said valve to first supply a loading stream and subsequently a balancing stream to said weighing means, and a valve closer having an inherent power to deliver a blow upon and complete the closure of said valve to cut off the balancing stream and controllable by the weighing means.

3. In a weighing machine, the combination of weighing means, means having a valve for supplying material thereto, means for opening said valve to first supply a loading stream to the weighing means and for subsequently partially closing said valve to supply a balancing stream to said weighing means, and a valve closer having an inherent power to impart an impact to and complete the closure of said valve and releasable automatically by said weighing means.

4. In a weighing machine, the combination of weighing mechanism, means including a valve for supplying material thereto, means for operating said valve to first supply a loading stream and subsequently a balancing stream to the weighing mechanism, means normally disconnected from said valve and having inherent power to operate and complete the closure of said valve to cut off the balancing stream under the control of the weighing mechanism, and means for restoring the valve-closing means automatically to normal position upon the completion of each weighing operation.

5. In a weighing machine, the combination of weighing mechanism, means including a valve for supplying material thereto, means for operating said valve to first supply a loading stream and subsequently a balancing stream to the weighing mechanism, a valve closer having an inherent power to complete the closure of said valve to cut off the balancing stream and controllable by the weighing mechanism, and means for restoring the valve closer automatically to normal position upon the completion of each weighing operation under the control of the weighing mechanism.

6. In a weighing machine, the combination of weighing mechanism, means including a valve for supplying material thereto, means for operating said valve to supply a loading stream and subsequently a balancing stream to said weighing mechanism, and a valve-closing device releasable by the weighing mechanism and having actuating means capable after its release of developing power and completing the closure of the valve to cut off the drip stream.

7. In a weighing machine, the combination of weighing mechanism, means including a valve for supplying material thereto, means for operating said valve to supply a loading stream and subsequently a reduced or balancing stream to the weighing mechanism, and a valve-closing device releasable by the weighing mechanism and having an actuating weight normally disconnected from said valve and capable when released of completing the closure of the valve to cut off the reduced or balancing stream.

8. In a weighing machine, the combination of weighing mechanism, means including a valve for supplying material thereto, means for operating said valve to supply a loading stream and subsequently a reduced or balancing stream to the weighing mechanism, and a valve-closing device operative independently of the valve-operating means aforesaid under the control of the weighing mechanism and having an inherent power to complete the closure of said valve to cut off the drip stream.

9. In a weighing machine, the combination of weighing mechanism, means including valve mechanism for supplying material to the weighing mechanism, means for operating said valve mechanism to first supply a loading stream and subsequently a balancing stream to the weighing mechanism, and means movable relatively to said valve mechanism and having an inherent power to operate said valve mechanism to cut off the drip stream and releasable automatically by the weighing mechanism.

10. In a weighing machine, the combination of weighing mechanism, means including valve mechanism for supplying material thereto, means for operating said valve mechanism to first supply a loading stream and subsequently a balancing stream to the weighing mechanism and including a driving shaft, and a device operative independently of said driving shaft to actuate said valve mechanism under the control of the weighing mechanism to cut off the balancing stream.

11. In a weighing machine, the combination of weighing mechanism, means including valve mechanism for supplying material thereto, means including a driving shaft for operating the valve mechanism to first supply a loading stream and subsequently a balancing stream to the weighing mechanism, a device having an inherent power to operate said valve mechanism to cut off the balancing stream and controllable by the weighing mechanism, and means operative by said driving shaft and controlled by the weighing mechanism for restoring said device to normal position.

12. In a weighing machine, the combination of weighing mechanism, means including valve mechanism for supplying material thereto, means including a driving shaft for operating said valve mechanism to first supply a loading stream and subsequently a reduced or balancing stream to said weighing mechanism, a valve closer operative independently of said driving shaft and under the control of the weighing mechanism for imparting an impact to said valve mechanism and thereby interrupting or cutting off the balancing stream, and means operative by said driving shaft for restoring said valve closer to normal operative condition.

13. In a weighing machine, the combination of weighing mechanism, means including valve mechanism for supplying material thereto, means including a driving shaft for operating said valve mechanism to supply a loading stream and subsequently a reduced stream to said weighing mechanism, a valve-closing device having an actuating weight normally inactive relatively to the valve mechanism and capable of operating said valve mechanism to cut off the reduced stream, the release of said device being under the control of the weighing mechanism, and means operative by said driving shaft for restoring the said valve-closing device to normal operative position.

14. In a weighing machine, the combination of weighing mechanism, means including valve mechanism for supplying material thereto, means including a driving shaft for operating said valve mechanism to supply a loading stream and subsequently a reduced or balancing stream to the weighing mechanism, a device operative independently of said driving shaft and under the control of the weighing mechanism for cutting off the balancing stream, and means controllable by the weighing mechanism and operative by said driving shaft for restoring said device to normal operative position upon the completion of each weighing operation.

15. In a weighing machine, the combination of weighing mechanism, means including valve mechanism for supplying material thereto, a driving shaft, means for operating said valve mechanism to supply a loading stream and subsequently a balancing stream to the weighing mechanism, a device operative independently of said driving shaft and controllable by the weighing mechanism for cutting off the balancing stream, and means controllable by the weighing mechanism and operative by said driving shaft for restoring said device to normal operative position after each weighing operation has been completed.

16. In a weighing machine, the combination of weighing mechanism, means including valve mechanism for supplying material thereto, a driving shaft, means for operating said valve mechanism for supplying a loading stream and subsequently a reduced or balancing stream to the weighing mechanism, a weight controllable by the weighing mechanism for cutting off said reduced or balancing stream, and means controllable by the weighing mechanism and operative by said driving shaft for restoring said weight to normal operative position.

17. In a weighing machine, the combination of weighing mechanism, means including valve mechanism for supplying material thereto, a driving shaft, means for operating said valve mechanism to supply a loading stream and subsequently a reduced or balancing stream to the weighing mechanism, a device controllable by the weighing mechanism for cutting off or interrupting the reduced or balancing stream, and means for restoring said device to normal operative condition involving a rotary member normally disconnected from but adapted to be operated by said driving shaft.

18. In a weighing machine, the combination of weighing mechanism, means including valve mechanism for supplying material thereto, a driving shaft, means for operating said valve mechanism to supply a loading stream and subsequently a reduced or balancing stream to the weighing mechanism, a device controllable by the weighing mechanism for cutting off or interrupting the reduced or balancing stream, and means for restoring said device to normal operative condition involving a rotary member normally disconnected from but adapted to be operated by said driving shaft, said rotary member being releasable automatically by the weighing mechanism after the latter has completed each weighing operation.

19. In a weighing machine, the combination of weighing mechanism, means including valve mechanism for supplying material thereto, means for operating said valve mechanism to first supply a loading stream and subsequently a reduced or balancing stream to the weighing mechanism, and means for cutting off the reduced or balancing stream including a reciprocatory member adapted to impart a final closing movement to the valve mechanism, a weighted arm adapted to operate upon said member to reciprocate it, and controlling means for the weighted arm releasable automatically by the weighing mechanism.

20. In a weighing machine, the combination of weighing mechanism, means including valve mechanism for supplying material thereto, means for operating said valve mechanism to supply a loading stream and subsequently a reduced or balancing stream to the weighing mechanism, and means for operating the valve mechanism to cut off the balancing stream including a reciprocatory bar adapted to operate upon the valve mechanism and having a shoulder or projection thereon, a pivoted and weighted arm having a portion adapted to engage said shoulder or projection on the bar, a pawl movable with said weighted arm, and a trigger coöperative with said pawl and operative automatically by the weighing mechanism to release the pawl.

21. In a weighing machine, the combination of weighing mechanism, means including valve mechanism for supplying material thereto, and means for operating said valve mechanism including a reciprocatory member, a weighted arm adapted to engage and reciprocate the same, means controllable by the weighing mechanism for automatically releasing said weighted arm, and means for restoring said reciprocatory member and also said weighted arm after each valve-closing movement thereof.

22. In a weighing machine, the combination of weighing mechanism, means including valve mechanism for supplying material thereto, and an automatic valve-closing device embodying a reciprocatory bar adapted to actuate the valve mechanism and having a shoulder or projection thereon, a pivoted and weighted arm having a portion to coöperate with said shoulder or projection, a pawl movable with said weighted arm, a trigger coöperative with said pawl and releasable automatically by the weighing mechanism to permit operation of said weighted arm, means for restoring said bar and also said weighted arm after each valve-closing movement thereof, and a guard carried by said bar and adapted to coöperate with said pawl to limit the restoring movement of the weighted arm.

23. In a weighing machine, the combination of weighing mechanism, means including valve mechanism for supplying material thereto, means for operating said valve mechanism to first supply a loading stream and subsequently a reduced or balancing stream to said weighing mechanism, a device for automatically cutting off said reduced or balancing stream including a reciprocatory bar adapted to coöperate with said valve mechanism, a device releasable automatically by the weighing mechanism for imparting valve-closing movement to said bar, and means for reciprocating said bar to restore the valve-closing device to normal position while said valve mechanism is being moved in a position to supply a loading stream and for subsequently partially returning said bar while said valve mechanism is being operated to supply a reduced or balancing stream.

24. In a weighing machine, the combination of weighing mechanism, means including valve mechanism for supplying material thereto, a driving shaft, means operated thereby for actuating said valve mechanism to first supply a loading stream and subsequently a reduced or balancing stream to the weighing mechanism, a device releasable automatically by the weighing mechanism and operative independently of said driving shaft for automatically cutting off the reduced or balancing stream, and means controllable by the weighing mechanism and operative to restore said device to normal operative position after said valve mechanism has been operated to supply the loading stream for the next weighing operation.

25. In a weighing machine, the combination of weighing mechanism including a weigh-hopper provided with a discharge gate, means including valve mechanism for supplying material thereto, a driving shaft, means operative by the driving shaft for actuating said valve mechanism to first supply a loading stream and subsequently a reduced or balancing stream to said hopper, a device releasable automatically by the weighing mechanism for actuating the valve mechanism to cut off the reduced or balancing stream, and a member controlled by the weighing mechanism and operative to automatically open said discharge gate and to restore said device to normal operative position after each weighing operation has been completed.

26. In a weighing machine, the combination of weighing mechanism including a weigh hopper and a discharge gate, means for supplying material to the weigh hopper, a driving shaft, a member for opening said discharge gate, and a rotary element controlled by the weighing mechanism and adapted when released to receive power from said driving shaft and to operate said member to open the discharge gate.

27. In a weighing machine, the combination of weighing mechanism including a weigh hopper having a discharge gate, means for supplying material to the weigh hopper, a reciprocatory bar for actuating said gate, a latch for normally locking said bar to hold said gate in closed position, and an element controlled by the weighing mechanism and operative to first release said latch and to subsequently actuate said bar to open the discharge gate.

28. In a weighing machine, the combination of weighing mechanism including a weigh hopper having a discharge gate, a reciprocatory bar for opening said gate, a latch for normally locking said bar to hold said gate in closed position, a driving shaft, and a rotary member adapted to be driven by said shaft and having a projection operative to first release said latch and to subsequently actuate said bar to open the discharge gate.

29. In a weighing machine, the combination of weighing mechanism including a weigh hopper having a discharge gate, a reciprocatory member operatively connected to said gate, a latch adapted to normally lock said member and thereby hold said gate in closed position, a driving shaft, and a rotary member normally held inoperative by the weighing mechanism and adapted when released to receive power from said shaft and first release said latch and subsequently actuate said member to open the discharge gate.

30. In a weighing machine, the combination of weighing mechanism including a weigh hopper having a discharge gate, a reciprocatory member operatively connected to said gate, a driving wheel adapted to revolve continuously, and a rotary member having a concentric periphery with an interrupted portion adapted to normally rest opposite to said driving wheel, the concentric portion of the periphery of said rotary member when in engagement with said driving wheel serving to rotate said member and cause the latter to actuate said bar to open the discharge gate.

31. In a weighing machine, the combination of weighing mechanism including a weigh hopper having a discharge gate, a member for opening said gate, a driving wheel adapted to revolve continuously, a rotary member having an interrupted or flattened portion in its concentric periphery, said member having means normally tending to rotate it to bring a concentric portion of its periphery into engagement with said driving wheel, and a device controllable by the weighing mechanism for normally holding said member in a position to present its interrupted portion to said driving wheel, said member having means to actuate the gate-closing member.

32. In a weighing machine, the combination of weighing mechanism including a weigh hopper provided with a discharge gate, a member for actuating said gate to open it, a driving wheel adapted to revolve continuously, a rotary member having its concentric periphery provided with an interrupted portion, said member also having a tendency to rotate so as to present the concentric portion of its periphery to the driving wheel, a device on said rotary member adapted to engage and actuate said gate-closing member, and a controlling bar releasable by the weighing mechanism for normally holding said rotary member in inoperative position and adapted when released to permit movement of said member.

33. In a weighing machine, the combination of weighing mechanism including a weigh hopper provided with a discharge gate, a reciprocatory bar operatively connected to said gate for opening and closing it, a driving shaft, means controlled by the weighing mechanism and adapted to be driven by said shaft to actuate said bar and open the discharge gate, and a resetting device also driven by said shaft for restoring said bar to normal position and closing the discharge gate.

34. In a weighing machine, the combination of weighing mechanism including a weigh hopper provided with a discharge gate, a reciprocatory bar for opening and closing said gate, a latch for normally locking said bar to hold said gate in closed position, a driving shaft, means controlled by the weighing mechanism and operative by said shaft to first release said latch and to subsequently reciprocate said bar to open the discharge gate, and means also operated from said shaft to restore said bar to normal locked position with respect to said latch.

35. In a weighing machine, the combination of weighing mechanism, means including valve mechanism for supplying material thereto, a driving shaft, a cam shaft including a clutch for operatively connecting it to the driving shaft, means actuated by said cam shaft for operating the valve mechanism to supply a loading stream and subsequently a reduced or balancing stream to the weighing mechanism, a device controlled by the weighing mechanism and operative independently of said driving shaft for actuating the valve mechanism to cut off the reduced or balancing stream, and means controlled by the weighing mechanism and operated by said driving shaft for restoring said device and for setting said clutch for the cam shaft in driving condition.

36. In a weighing machine, the combination of weighing mechanism including a weigh hopper provided with a discharge gate, means including valve mechanism for supplying material to the weigh hopper, a driving shaft adapted to revolve continuously, a cam shaft provided with a clutch for operatively connecting it to the driving shaft, means actuated by the cam shaft to operate the valve mechanism to supply a loading stream and subsequently a reduced or balancing stream to the weigh hopper, a device controlled by the weighing mechanism for cutting off the reduced or balancing stream, a reciprocatory member for opening and closing said discharge gate, a latch for normally locking said member to hold said gate in closed position, and a rotary member controlled by the weighing mechanism and adapted to be actuated by said driving shaft upon the completion of each weighing operation, said rotary member having a projection operative to first unlock said latch, then to reciprocate the member and to subsequently restore the device for cutting off the balancing stream to normal condition and to establish an operative connection between the cam shaft and driving shaft through said clutch.

In testimony whereof I have hereunto set my hand in presence of two subscribing witnesses.

FREDERICK J. HEYBACH.

Witnesses:
　　CLARENCE A. BATEMAN,
　　CHAS. S. HYER.

---

Copies of this patent may be obtained for five cents each, by addressing the "Commissioner of Patents, Washington, D. C."